US00RE37943E

(19) United States
(12) Reissued Patent
Domenig

(10) Patent Number: US RE37,943 E
(45) Date of Reissued Patent: Dec. 31, 2002

(54) ROTARY SHELF MECHANISM

(76) Inventor: Georg Domenig, 1115 Whispering Pines, Kernersville, NC (US) 27284

(21) Appl. No.: 09/738,969

(22) Filed: Dec. 16, 2000

Related U.S. Patent Documents

Reissue of:
(64) Patent No.: 6,017,108
Issued: Jan. 25, 2000
Appl. No.: 09/200,568
Filed: Nov. 27, 1998

(51) Int. Cl.[7] ..... A47B 88/00
(52) U.S. Cl. ..... 312/305; 312/135
(58) Field of Search ..... 312/305, 125, 312/135, 197, 202, 258, 351.2, 238; 211/77, 78, 144, 163

(56) References Cited

U.S. PATENT DOCUMENTS

| | | | | | |
|---|---|---|---|---|---|
| 1,474,847 | A | * | 11/1923 | Phillips et al. | 312/229 X |
| 1,908,797 | A | * | 5/1933 | Svalland | 312/245 X |
| 2,629,643 | A | * | 2/1953 | Davidson | 312/305 X |
| 2,637,613 | A | * | 5/1953 | Motter | 312/305 X |
| 2,693,401 | A | * | 11/1954 | Brown | 312/329 X |
| 2,698,776 | A | * | 1/1955 | Stoeckl | 312/326 X |
| 3,127,994 | A | * | 4/1964 | Campbell | 211/144 |
| 3,281,197 | A | * | 10/1966 | Anderson | 312/305 |
| 3,628,844 | A | * | 12/1971 | Preston | 312/305 |
| 3,982,800 | A | * | 9/1976 | Gorton et al. | 312/135 X |
| 4,181,037 | A | * | 1/1980 | Boon et al. | 312/125 X |
| 4,418,970 | A | * | 12/1983 | Hyder et al. | 312/135 X |
| 4,433,885 | A | | 2/1984 | Baker | |
| 4,572,595 | A | | 2/1986 | Craig | |
| 4,587,908 | A | | 5/1986 | DeBruyn | |
| 4,616,940 | A | | 10/1986 | DeBruyn | |
| 4,688,686 | A | | 8/1987 | Mitts et al. | |
| 5,279,429 | A | * | 1/1994 | Sagel | 211/163 X |
| 5,312,003 | A | | 5/1994 | Domenig | |
| 5,494,346 | A | | 2/1996 | Domenig | |
| 6,017,018 | A | | 1/2000 | Domenig | |

* cited by examiner

*Primary Examiner*—James O. Hansen

(57) ABSTRACT

A rotary shelf for use within a cabinet which has first and second mounting brackets spaced apart and opposing each other attached to the bottom and to the top of the inside of the cabinet. The mechanism includes integrally formed shelves, a shelf and post securing mechanism wherein a notched member affixed to a mounting bracket cooperatively receives an engaging member to secure the post and shelves in a stationary position. The mechanism also includes a shelf and cabinet opening adjustment mechanism to permit threadable adjustment of the post and carried shelves with respect to the cabinet opening.

15 Claims, 7 Drawing Sheets

ROTARY SHELF MECHANISM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to lazy susan devices and more particularly to a rotary shelf mechanism for use within a cabinet whose post and shelves can be locked positively in a storing position, whose post and shelves can be adjusted with respect to the cabinet opening, and whose shelves are integrally formed.

2. Description of the Prior Art

It has been common practice to provide in corner kitchen cabinets, shelves of a rotatable or lazy susan type. This shelving has become popular because without it, considerable cabinet space in the corner, either above or below the kitchen counter is wasted due to the inaccessibility of items well back in the corner. A considerable number of rotatable corner shelf units are based on the structure wherein a tubular element forms a vertical rotatable axis attached to the shelves. Since the door formed within the structure of the shelving must align with the cabinet opening for an attractive and professional fit, a number of methods have been employed to secure that appearance, often requiring adjustment means to bring the structure back into proper alignment in the event it becomes altered for whatever reason.

Various adjustment devices have been provided to align the shelf mechanism. See, for example, U.S. Pat. Nos. 3,127,994; 4,433,885; 4,486,107 and 4,688,686.

Unfortunately, correction of this alignment problem within such prior art assemblies have not been fully successful to enable the components within the cabinet to conform to the opening, and adjustment frequently requires partial disassembly of the shelf assembly which necessitates removal of all or most of the stored goods therein. These adjustments and efforts are troublesome, time-consuming and often laborious.

Moreover, prior art means for adjusting the shelf assembly require the use of tools, and often the prior art adjusting mechanism is not easily accessible for adjustment.

Finally, all prior shelving formed from plastic-like materials has been made up of numerous components assembled together to fit in a proper manner about the shaft which are joined together by pins or screws in a manner to assure that the shelf is securely attached to the post and moves uniformly when the post is rotated. Shelves formed of numerous components are expensive to assemble and often do not fit properly because of the many components that are joined together to form the completed shelf.

Thus, there is still a need for smooth and quiet shelf movement and locking action, adjustments to align the shelves and supporting posts with the cabinet opening, and improvements in the complicated structure of the lazy susan shelving. It is to these needs that the present invention is directed.

SUMMARY OF THE INVENTION

The present invention is an improvement in lazy susan devices and, more particularly, in a rotary shelf mechanism for use within a cabinet which has first and second mounting brackets spaced apart and opposing each other, shelf and post securement means which includes a notched plate affixed to a mounting bracket and post insert means having a bracket engaging element cooperatively received by the mounting bracket plate and operable with a noise absorbing member to quietly secure the post in a stationary position. The shelf and opening adjustment means includes a mounting bracket adjustment plate carrying a threadable insert cooperatively receiving the threaded adjusting member to cause the adjusting plate, when the adjusting member is rotated, to move with respect to the mounting bracket to adjust the post and shelves with respect to the opening. Of significant importance is the provision of an integrally formed (molded one piece) shelf, thus avoiding the problems associated with assembled shelf components that are selectively positioned on the length of the post to received goods for storage or to collapse and provide a more efficient shipping package.

From the summary of the invention described, it will be apparent that a primary object of the present invention is to provide a lazy susan assembly having a rotary shelf mechanism for use within a kitchen cabinet that utilizes integrally formed shelves to significantly reduce the cost of shelving previously used.

Another object of the present invention is to provide a rotary shelf mechanism for use within the cabinet that includes a shelf and post securing means to provide an efficient, smooth and silent engagement with a spring biased member and a mounting bracket plate notch to secure the post and sleeves in a stationary position.

A further object of the present invention is to provide a shelf and opening adjustment means that will enable a single threaded engagement member to align the post and shelves with the cabinet opening.

Yet still another object of the present invention is to provide an alternative shelf and post securing means wherein a plate engagement element has a recess therein and an upstanding plate and cooperative flexing member engage the recess and secure the post and shelves in a stationary position.

Yet still another further object of the present invention is to provide a noise absorbing member operable with the upstanding plate and flexing member to reduce wear and noise upon movement of the post and shelves.

Thus, there has been outlined the more important features of the invention in order that the detailed description that follows may be better understood and in order that the present contribution to the art may be better appreciated. There are, of course, additional features of the invention that will be described hereinafter which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting. As such, those skilled in the art will appreciate that the concept upon which this disclosure is based may readily be utilized as a basis for designing other structures, methods, systems and in carrying out the several purposes of the present invention. It is important that the claims be regarded as including such equivalent methods and products resulting therefrom so long as they do not depart from the spirit and scope of the present invention. The application is neither intended to define the invention which is measured by its claims nor to limit its scope in any way.

For a better understanding of the invention, its operating advantages, and the specific results obtained by its use, reference should be made to the following detailed description taken in conjunction with the accompanying drawings wherein like characters of reference designate like parts throughout the several views.

DETAILED DESCRIPTION OF THE PREFERRED EMBODIMENTS

Figure 3:
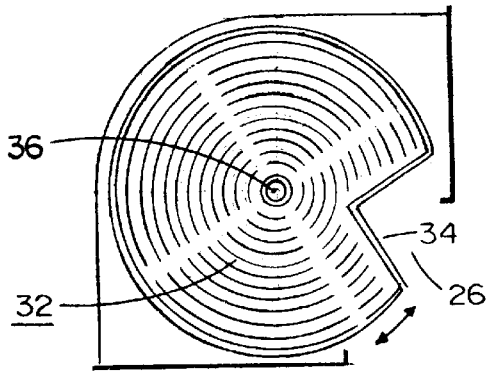
FIG. 3 is a schematic plan view of the housing shown in FIG. 2 illustrating the cooperative relationship between tubular post, carried shelves and the housing opening.
Figure 2:
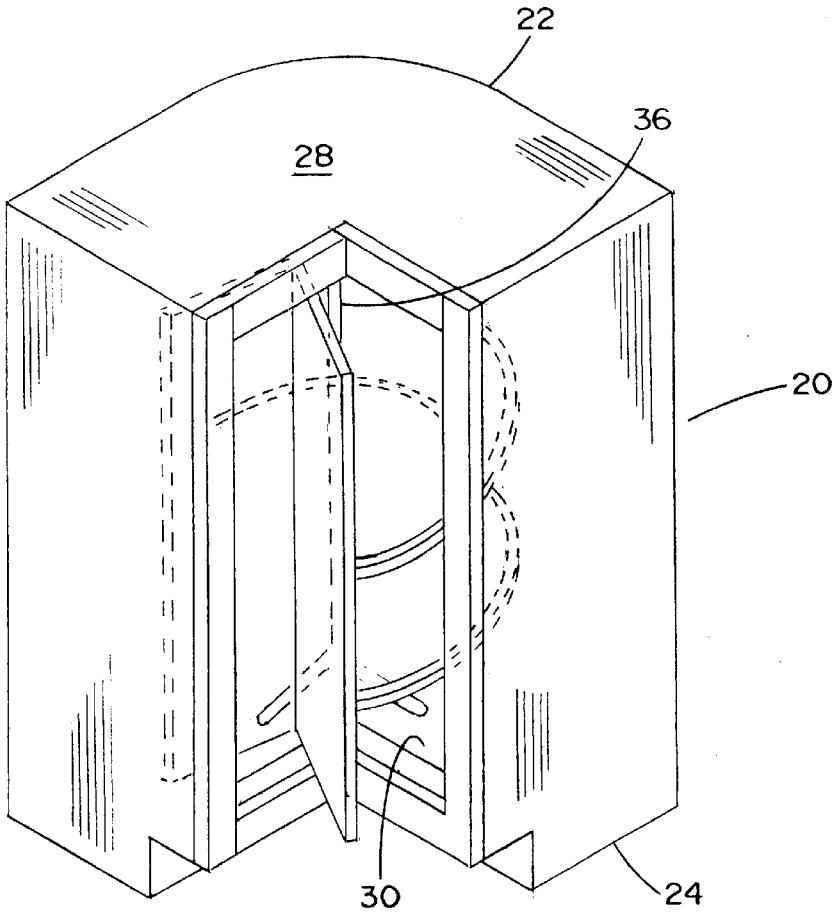
FIG. 2 is a schematic and perspective view of the housing within which the tubular post and its carried components reside.

Referring now to the drawings and particularly to FIGS. 2 and 3, a housing shown generally as 20 forming the ninety degree connector between two runs of kitchen cabinets has an upper end 22, a lower end 24 and an opening 26. Upper end 22 is closed by cabinet top 28, and lower end 24 is closed by cabinet bottom 30. Shelves 32 in the cabinet configuration have a notched 90 degree insert which forms the door 34 for opening 26. Shelves 32 are affixed to a tubular post 36.

Figure 1:
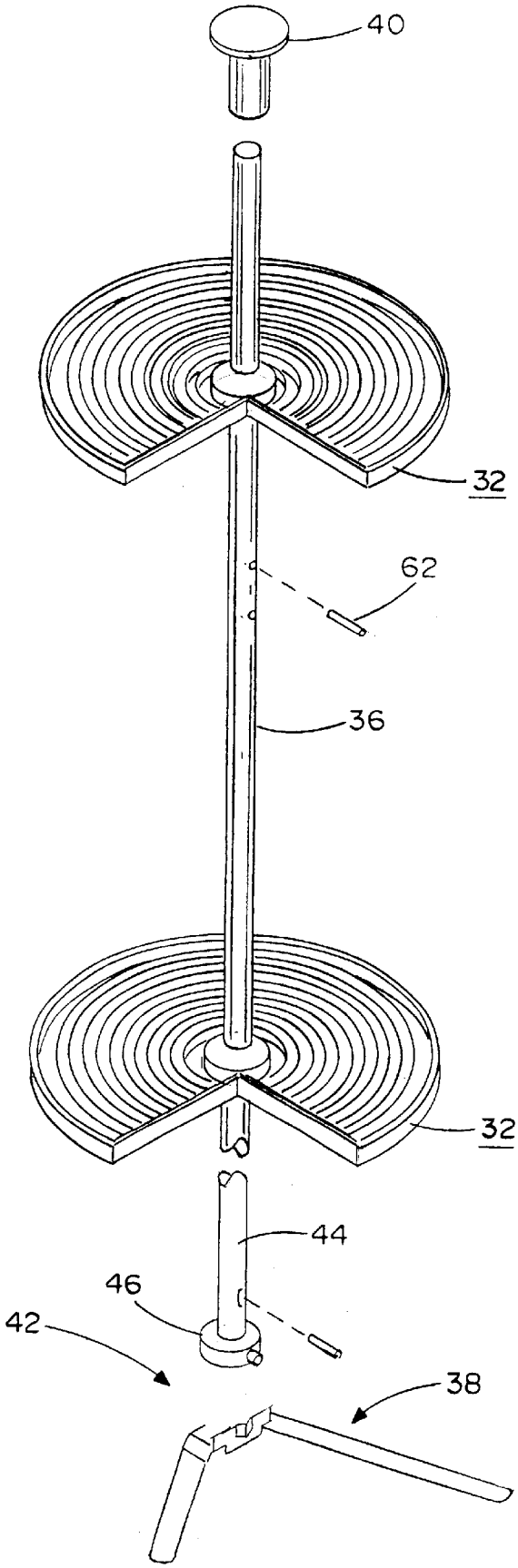
FIG. 1 is a perspective, fragmentary and partially exploded view of the tubular post and its carried components of the lazy susan system comprising the present inventive concept.

Referring now to FIG. 1, tubular post 36 carries on one end a first mounting bracket 38 and on the other end a second mounting bracket 40. First mounting bracket 38 is secured to cabinet bottom 30 and second mounting bracket 40 is secured to cabinet top 28. Shelves 32 are releasably secured to tubular post 36 in a manner to be described subsequently. Shelves 32 will be secured to post 36 so that when door 34 is opened, shelves 32 and post 36 will rotate to provide opening 26.

Figure 8:
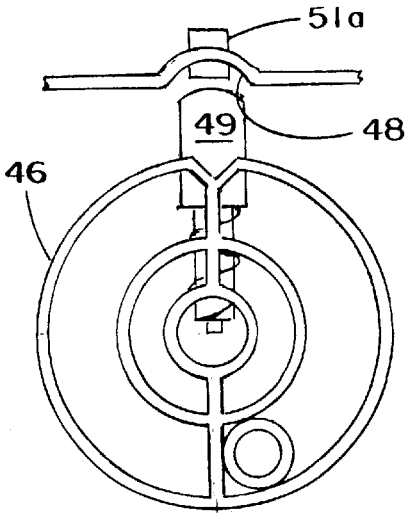
FIG. 8 is a bottom view of the bracket engaging element carrying a spring biased engaging member.
Figure 9:
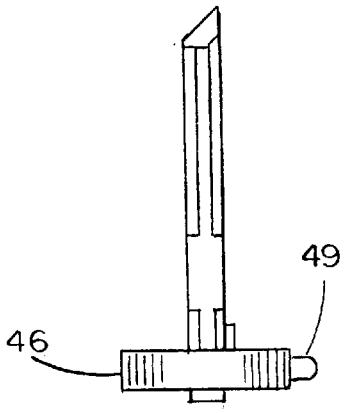
FIG. 9 is a side elevational view of the post insert means shown in FIG. 8.

A shelf and post securing mechanism is shown generally as 42 and includes a plate engagement element 46 with a spring biased engaging member 49 (FIGS. 1 and 8) cooperatively received by notch 48 of vertical member 51 to secure post 36 and shelves 32 in a stationary position when opening 26 is closed by door 34. A small resilient member 51a extends through an opening 51b in engagement element 46 to cushion the engagement of member 49 within notch 48 and eliminate noise.

Figure 10:
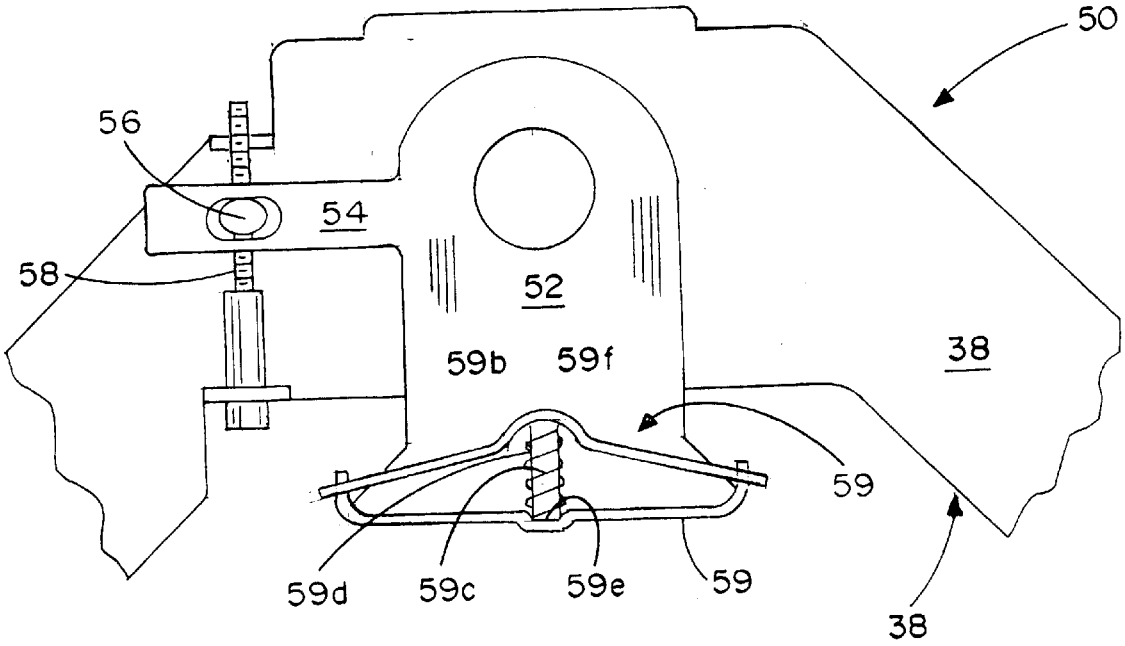
FIG. 10 is a plan, enlarged and fragmentary view of the shelf and opening adjustment mechanism.
Figure 11:
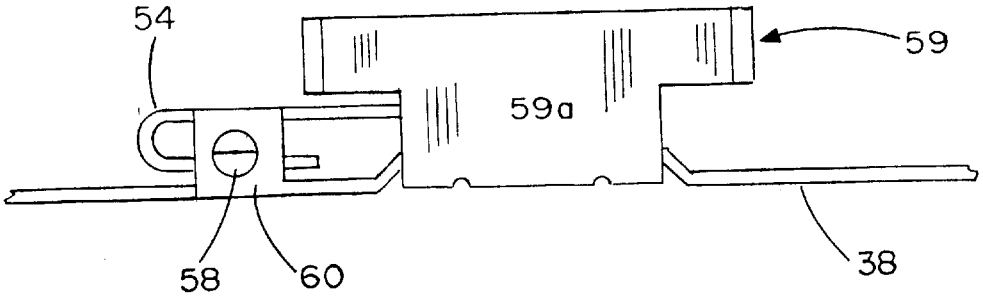
FIG. 11 is a front elevational and fragmentary view of the mechanism shown in FIG. 10.

Another embodiment of a shelf and post securing mechanism is shown generally as 50 in FIGS. 10 and 11 where it is attached to the first mounting bracket adjustment plate 52. Mechanism 52 includes an upstanding backing element 59a and a resilient locking element 59b connected to backing element 59a and formed of resilient material such as plastic or rubber so that it will yield and operate silently with plate engaging element 46. To ensure sufficient resiliency in response, a spring 59c is positioned between backing element 59a and locking element 59b in the manner best shown in FIG. 10. A post 59d is affixed to backing element 59a and within recesses 59e and 59f to ensure that spring 59c stays in position.

Figure 12:
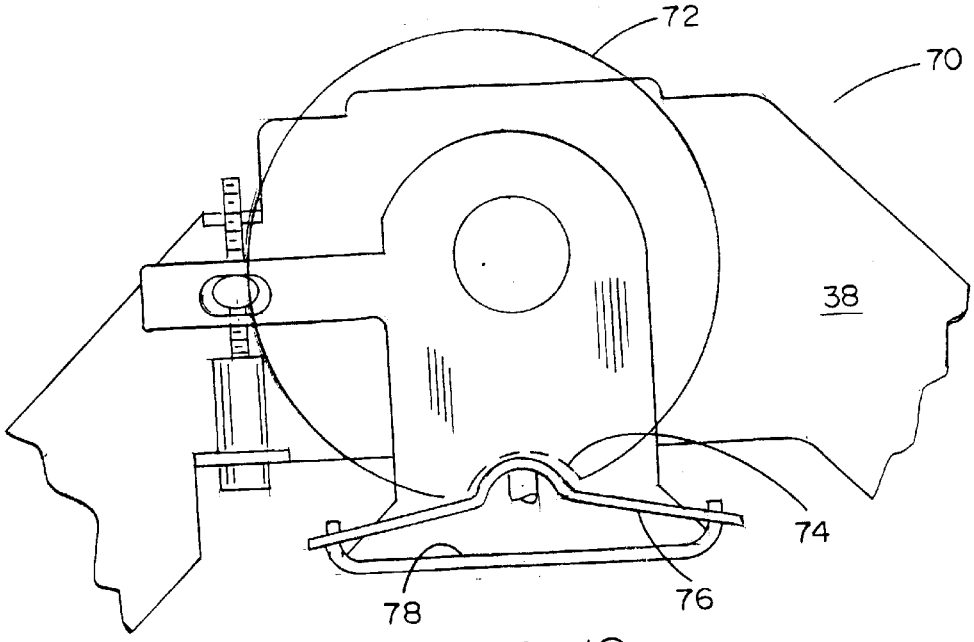
FIG. 12 is a plan, enlarged and fragmentary view of an alternative embodiment of the shelf and post securing means.
Figure 13:
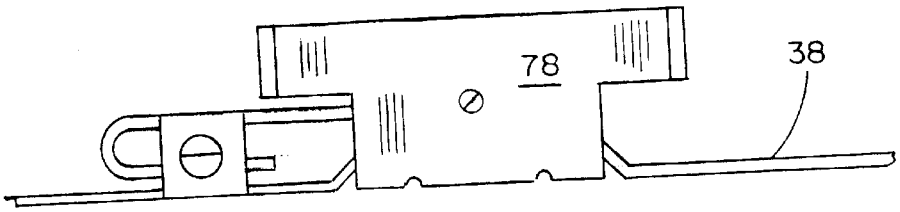
FIG. 13 is a front elevational and fragmentary view of the mechanism shown in FIG. 12.
Figure 14:
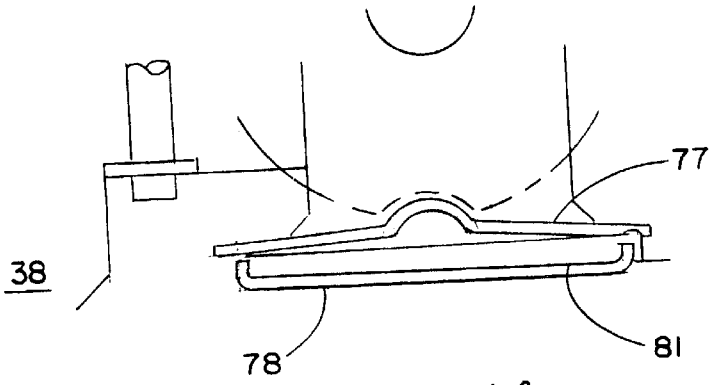
FIG. 14 is a plan, enlarged and fragmentary view of yet another embodiment of the shelf and post securing means.

Yet another embodiment of a shelf and post securing mechanism is shown generally as 70 in FIGS. 12, 13 and 14. Plate engagement element 46 has a notch 74 which cooperatively communicates with a flexing member 77 affixed to an upstanding backing element 78 whereby notch 74 and flexing member 77 engage to secure the post and shelves in a stationary position.

The previous embodiment is yet still enhanced by the inclusion of a noise absorbing member 81 (FIG. 14) operable with upstanding backing element 78 and flexing member 77 to reduce wear and noise upon movement of the post and shelves. The noise absorbing member can be made of any suitable material such as plastic, rubber, fiberglass or others capable of absorbing noise and reducing wear. It is preferably positioned between upstanding backing element 78 and flexing member 77 as shown in FIG. 14.

A shelf and opening adjustment mechanism is shown generally as 50 in FIGS. 10 and 11. Mechanism 50 includes a first mounting bracket adjustment plate 52 movably secured to mounting bracket 38, a housing connected to bracket 38, a threadable insert 56 carried within housing 54, and a threaded adjusting member 58 secured by a flange 60 to mounting bracket 38 to operably engage threadable insert 56 and cause adjusting plate 52 to move with respect to mounting bracket 38 and adjust post 36 and sleeves 32 with respect to opening 26.

Figure 4:
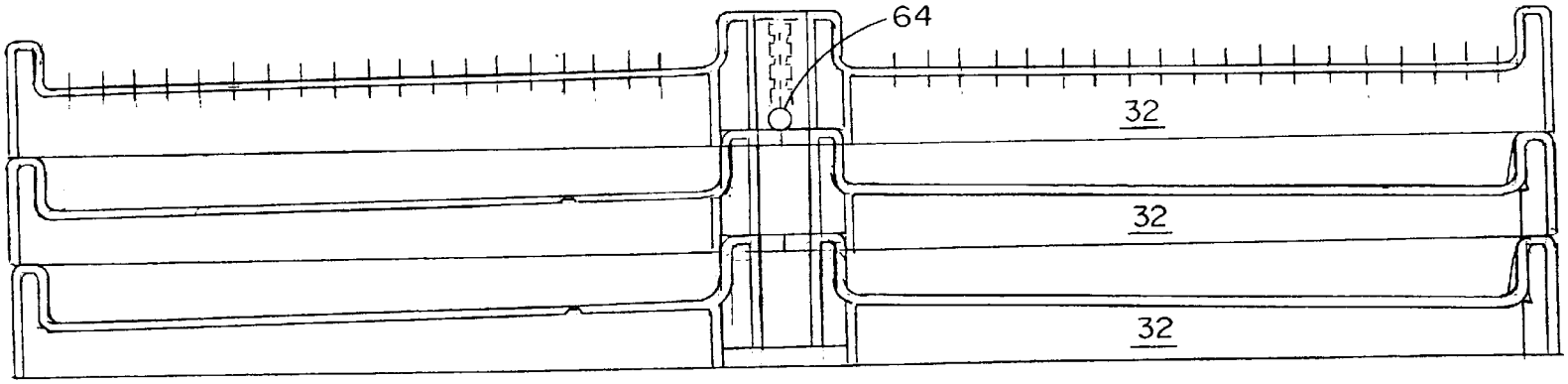
FIG. 4 is a side elevational, schematic and sectional view of a plurality of shelves collapsed upon themselves for compactness when they are to be shipped.
Figure 5:
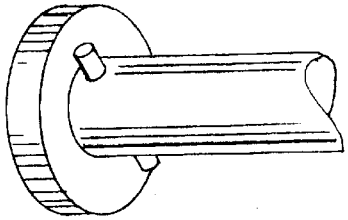
FIG. 5 is a fragmentary, enlarged and perspective view of the bottom of one of the shelves and its attachment to the tubular post.

Shelves 32 of the present invention have been, for the first time, integrally formed to avoid the use of numerous separate pieces and components to position the shelf on tubular post 36. Integrally formed shelves 32 provide significant strength, reliability and economic advantages. Assembly costs are significantly reduced, and structural failures are, for the most part, eliminated. Shelves 32 are molded so that they can be collapsed and stacked together (FIG. 4) to conserve space and resist movement and damage during shipment. When shelves 32 are positioned at the desired location on tubular post 36, they are maintained in that position by a simple pin 62 (FIG. 5) that fits within a recess (not shown) in the lower integrally formed collar 64 of shelf 32.

Figure 5C:
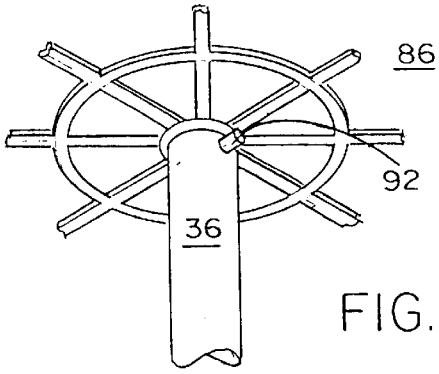
FIG. 5(c) is an enlarged, fragmentary and perspective view of the underneath side of a shelf engaging and being supported by the post.
Figure 5E:
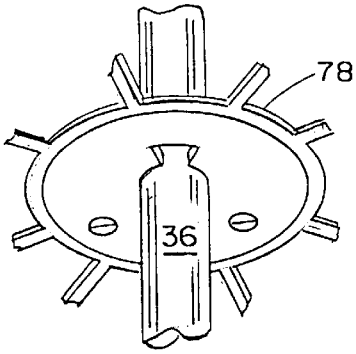
FIG. 5(e) is an enlarged fragmentary and perspective view of the plate shown in FIG. 5(d) secured to a shelf and the post.
Figure 5D:
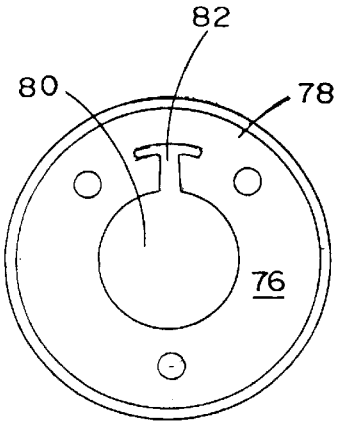
FIG. 5(d) is an enlarged plan view of the plate shown in FIG. 5(b)
Figure 5A:
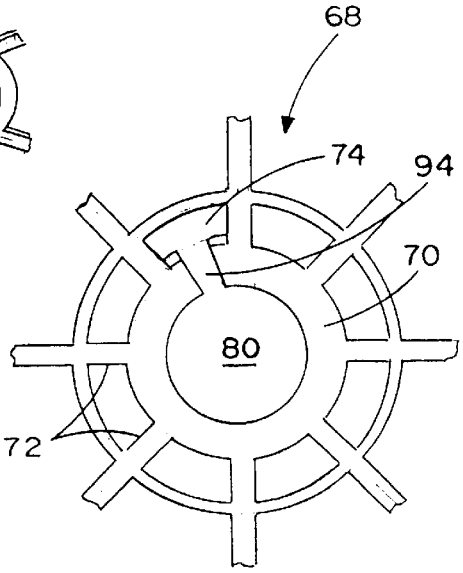
FIG. 5(a) is an enlarged, fragmentary and bottom plan view of the integral shelf support member of the present invention.

The integrally formed shelf in another embodiment is shown with particularity in FIG. 5(a) where a solid plastic hub, shown generally as 68, has an enlarged circular support member 70 to encircle the post but is integrally formed with the other elements of the shelf such as struts 72. The integral shelf has openings 74 to allow the die insert elements to be extended therethrough and retracted therefrom.

Figure 5B:
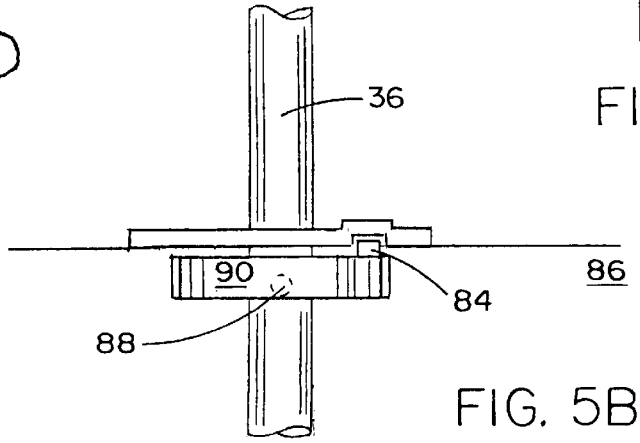
FIG. 5(b) is a side elevational, enlarged and fragmentary view of the supporting hub carrying the metal plate engaging a hub carried protrusion.
Figure 6:
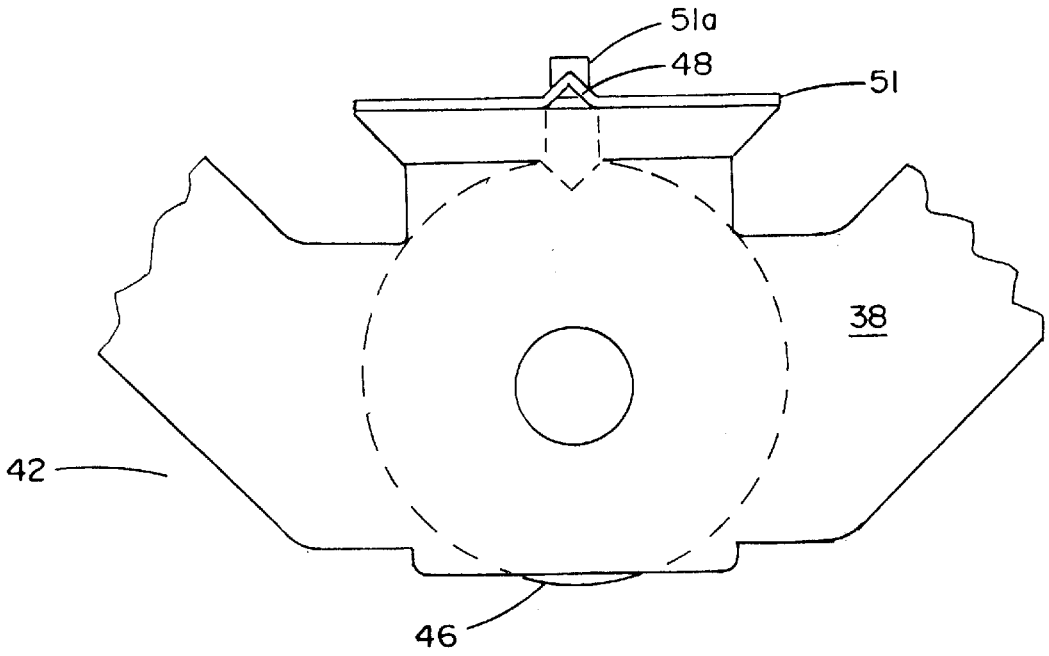
FIG. 6 is a plan, fragmentary and enlarged view of the first mounting bracket.
Figure 7:
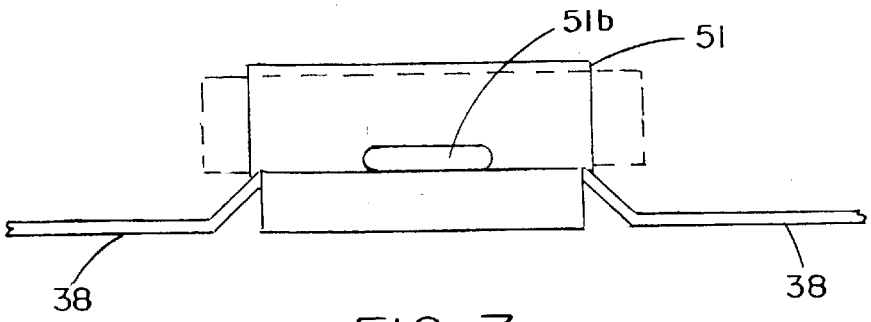
FIG. 7 is a end elevational and fragmentary view of the first mounting bracket of FIG. 6.

Another embodiment of the shelf connecting structure is shown in FIGS. 5(b) and 5(d) where a metal plate 76, preferably formed of stainless steel, is inserted over opening 74 to provide an opening 80 sufficient in size to comfortably encompass post 36. Plate 76 has a recess 82 shaped to accommodate a protrusion 84 (FIG. 5(b)) on supporting hub 90 therein and thereby cause shelf 32 to be at rest. A pin 88 secures supporting hub 90 to post 36 as shown.

Recess 82 cooperatively receives protrusion 84 as previously discussed. When shelf 32 needs to rotate with post 36, the insertion of a pin 92 as shown in FIG. 5(c) is sufficient to [secure shelf 32 to post 36 and rotate therewith] *form a shelf to post securing means and enable this joint rotation.*

In the pre-molded shelf construction shown in FIG. 5(a), a single opening 94 is provided to accommodate and cooperatively receive a pin (not shown) that extends through an opening in post 36.

While FIG. 1 shows only the use of shelf and post securing means 42 in connection with first mounting bracket 38, the shelf and opening adjustment mechanism 50 can also be affixed to first mounting bracket 38 so that both the shelf and post securing function and the shelf and opening adjustment function are incorporated within the same system. They can be used in combination or singularly as desired.

If the collapsed shelf feature is used, pin 62 can be used to anchor the collapsed shelves in the shipping position. Once at the installation site, pin 62 can be removed and shelves 32 can be positioned at their normal locations and secured with pin 62 as previously described.

The techniques involved in forming the novel combination set forth in the present inventive concept and the components associated therewith are unlimited and are deemed readily apparent and obvious to one skilled in the art. All equivalent relationships to those illustrated in the drawings and described in the specification are intended to be encompassed herein. Consequently, the following is considered as illustrative only of the principles of the invention. Since numerous modifications and changes will readily occur to those skilled in the art, it is not desired to limit the invention to the exact construction and operation shown and described. All suitable modifications and equivalents falling within the scope of the appended claims are deemed within the present inventive concept.

What is claimed is:

1. An adjustable and alignable lazy susan shelf assembly comprising: a housing defining a cavity, the housing having a top, a bottom and an opening; first and second mounting brackets spaced apart and opposing each other, the first mounting bracket secured to the bottom and the second mounting bracket secured to the top; a tubular post having first and second ends disposed at lengthwise between the first and second mounting brackets; shelves slideable along and releasably secured to the tubular post; shelf and post securing means associated with one end of the post and one of the mounting brackets; and shelf and opening adjustment means secured to one of the mounting brackets wherein the shelf and post securing means includes an upstanding notched plate affixed to the first mounting bracket and a post insert means extending into a post end and having a spring biased plate engagement element cooperatively received by the plate notch, the spring biased plate engagement element and notched plate are cooperatively operable to secure the post and shelves in a stationary position, and the notched plate has a resilient member positioned within the notch to engage the spring biased engaging member.

2. The assembly as claimed in claim 1 wherein the shelf and opening adjustment means includes a first mounting bracket adjustment plate movably secured to the first mounting bracket, a housing connected to the mounting bracket adjustment plate, a threadable insert carried within the housing, and a threaded adjusting member secured to the first mounting bracket to operably engage the threadable element and cause the adjusting plate to move with respect to the first mounting bracket and adjust the post and shelves with respect to the opening.

3. The assembly as claimed in claim 1 wherein the notched plate has a notched position aperture and further comprising a resilient member positioned within the aperture to engage the spring biased engaging member.

4. The assembly as claimed in claim 1 wherein the shelf and post securing means include a plate engagement element having a notch therein, an upstanding backing element secured to the first mounting bracket, and a flexing member operable with the upstanding backing element and cooperating with the plate engagement notch to secure selectively the post and shelves in a stationary position.

5. The assembly as claimed in claim 4 wherein the shelf and post securing means has a noise absorbing element operable with the upstanding backing element and flexing member to reduce wear and noise upon movement of the post and shelves.

6. The assembly as claimed in claim 5 wherein the noise absorbing member is positioned between the upstanding plate and the flexing member.

7. The assembly as claimed in claim 5 wherein the noise absorbing member is plastic.

8. The assembly as claimed in claim 5 wherein the shelf and opening adjustment means includes a first mounting bracket adjustment plate moveably secured to the first mounting bracket, a housing connected to the mounting bracket adjustment plate, a threadable insert carried within the housing, and a threaded adjusting member secured to the first mounting bracket to operably engage the threadable element and cause the adjusting plate to move with respect to the first mounting bracket and adjust the post and shelves with respect to the opening.

9. The assembly as claimed in claim 4 wherein the flexing member is stainless steel.

10. The assembly as claimed in claim 4 wherein the shelf and opening adjustment means includes a first mounting bracket adjustment plate moveably secured to the first mounting bracket, a housing connected to the mounting bracket adjustment plate, a threadable insert carried within the housing, and a threaded adjusting member secured to the first mounting bracket to operably engage the threadable element and cause the adjusting plate to move with respect to the first mounting bracket and adjust the post and shelves with respect to the opening.

11. The assembly as claimed in claim 1 wherein the slideable along and releasably secured tubular post shelves includes shelf securing means for avoiding movement and displacement of the shelves during shipment.

*12. An adjustable lazy susan assembly comprising: a housing defining a cavity, the housing having a top, a bottom and an opening; first and second mounting brackets spaced apart and opposing each other, the first mounting bracket secured to the housing bottom and the second mounting bracket secured to the housing top; a tubular post having first and second ends disposed lengthwise between the first and second mounting brackets; shelves slidable along and releasably securable to the tubular post at pre-selected post shelf positions; shelf and post securing means associated with one end of the post and one of the mounting brackets; and shelf and opening adjustment means secured to one of the mounting brackets, the shelf and post securing means including an upstanding notched plate affixed to the first mounting bracket and a post insert means extending into a post end and having a spring biased plate engagement element cooperatively received by the plate notch, the spring biased plate engagement element and notched plate being cooperatively operable to secure the post and shelves in a stationary position, and the notched plate having a resilient member positioned within the notch to engage the spring biased engaging member; and shelf to post securing means wherein each of the shelves is of one piece construction.*

*13. The assembly as claimed in claim 12 wherein the post has a diametric aperture located at each post shelf position and the shelf to post securing means for each shelf is a pin inserted into the post diametric aperture securing the shelf to the post.*

*14. The assembly as claimed in claim 12 wherein the shelves are integrally formed to enable collapsing and stacking in a nested compact condition around the post to conserve space and resist movement and damage during shipment.*

*15. The assembly as claimed in claim 12 wherein the shelves are removable from the post and stackable with each other in a nested and compact shipment and storage condition independent of the post to conserve space.*

* * * * *